Patented Aug. 19, 1924.

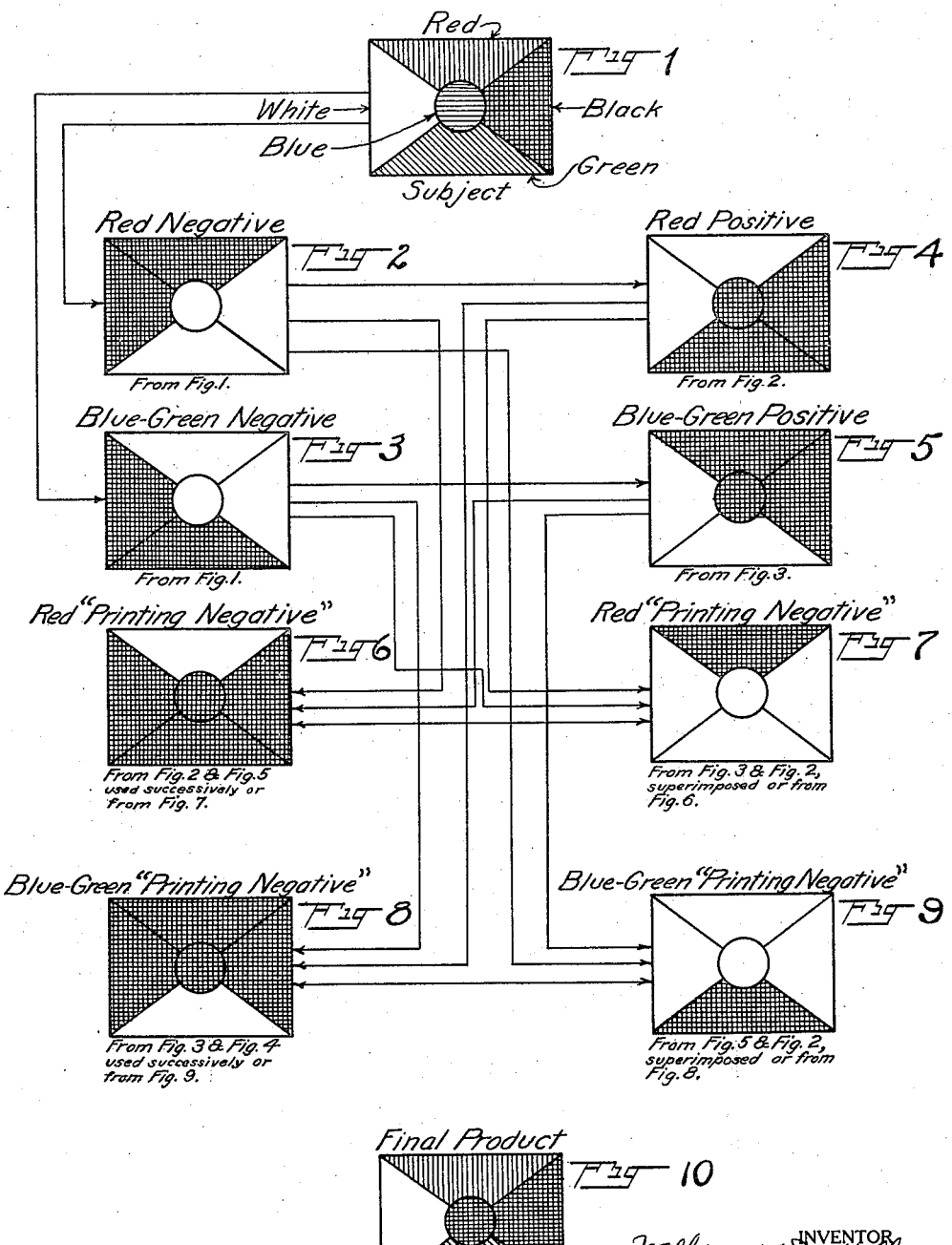

1,505,787

UNITED STATES PATENT OFFICE.

WILLIAM V. D. KELLEY, OF JERSEY CITY, NEW JERSEY.

COLOR PHOTOGRAPHY.

Application filed October 2, 1923. Serial No. 666,070.

*To all whom it may concern:*

Be it known that I, WILLIAM V. D. KELLEY, a citizen of the United States, and a resident of the city of Jersey City, county of Hudson, State of New Jersey (whose post-office address is 43 Townele Street, Jersey City, New Jersey), have invented a new and useful Improvement in Color Photography, of which the following is a specification.

This invention relates to photography and particularly to color photography.

A principal object of this invention is the production on a carrier of a composite photographic image of a subject which when viewed by transmitted light or as projected on a screen will exhibit an image fairly comparable in general characteristics with an ordinary black and white photographic image of that subject and will in addition exhibit a fairly approximate true color value of at least one color of the subject or two substantially complementary or perhaps three colors of the subject corresponding to the three fundamental primary colors of the solar spectrum.

A further object of this invention is the formation of a product as hereinbefore specified which will appear in a sigle coating on one side only of a carrier.

Other objects and advantages will appear as the description of the invention and particular specific applications of the principle of the invention proceeds and the novel features will be particularly pointed out in the appended claims.

In describing the invention in detail and particular specific applications of the invention selected for the purpose of illustrating the principle of the invention, reference will be had to the accompanying schematic drawings and the characters of reference thereon designating like parts in the several views, and in which:

Figure 1, is a schematic illustration of a colored subject:

Fig. 2 is a red filter negative of Fig. 1; Fig. 3, is a blue-green filter negative of Fig. 1; Fig. 4, is a positive of Fig. 2; Fig. 5, is a positive of Fig. 3; Fig. 6, is what I term a red "printing negative" made from red negative Fig. 2 and blue-green positive Fig. 5, used successively; Fig. 7, is a red "printing negative" made from blue-green negative, Fig. 3, and red positive, Fig. 2 superimposed; Fig. 8, is a blue-green printing negative made from blue-green negative, Fig. 3 and red positive Fig. 4, used successively; Fig. 9 is a blue-green printing negative made from blue-green positive, Fig. 5 and red negative, Fig. 2, superimposed; Fig. 10 is an illustration of a final product.

For the purpose of explaining the principle of my invention and the application thereof I have selected a subject which I have illustrated by Fig. 1 of the drawings. This subject is to be considered as being colored in the areas shown, as red, white, black, blue and green and as indicated on the drawing.

In carrying out my invention I first make color selection negatives of the subject, Fig. 1. If I desire my finished product to exhibit one color only other than black and white I make two color selection negatives, one through a red filter and one through a substantially blue-green filter, or on photographic material that is "blind" to certain colors and particularly sensitive to other colors. If I desire two colors to appear in my finished product I likewise make two color selection negatives. If I desire three colors to appear in my finished product then I make three color selection negatives using a blue filter, a green filter and a red filter.

In applying my invention to single or two color work, I would first produce the red selection negative Fig. 2 and the blue-green selection negative Fig. 3. For three color work I would first produce the three color selection negatives hereinbefore mentioned. The production of finished negatives such as has been herein printed out is an operation well known and thoroughly understood by those skilled in this art, both when made by successive or simultaneous exposure and for either still or motion pictures, and further explanation thereof is unnecessary especially as I lay no claim to novelty in the color selection negatives per se.

I desire to point out at this place that once the principle and mode of operation of my invention as applied to single or two color work is understood, any one skilled in the art to which this invention appertains may then readily apply the same to three color work, consequently in the further description of my invention reference to three color work will be made only in so far as to specifically connect it in principle with single or two color work.

Having obtained the two color selection negatives Figs. 1 and 2, I then, in the well known manner form finished positives from each of these, obtaining the positive illustrated by Fig. 4 from the negative, Fig. 2, and the positive, Fig. 5, from Fig. 3.

As my finished product is to exhibit the general characteristics of a black and white image as a foundation for my color, I must select or produce a carrier bearing such image. For this foundation image, or "key image" I may select the image of Fig. 4 or of Fig. 5, as suitable for my purpose, thereby avoiding the making of the ordinary and well known usual black and white image negative and print therefrom of the subject Fig. 1. I may obtain a perhaps better result than that obtained by using either Fig. 4, or Fig. 5 for my "key image" and still avoid making another negative directly from the subject by making a print using Figs. 2 and 3 together superimposed. In any event I prefer to make any black and white positive image by printing through the back of the carrier. If this is done and proper precautions taken as is well understood in the art, then I may have a minimum of reduced silver at the surface of the gelatine, that is the surface of the gelatine remote from the carrier, and consequently I assist in avoiding as much as possible the hardening of the gelatine by the developing process and so leave the gelatine in better condition to take up the color in the later steps of my process by imbibition, as will be explained more at length.

Regardless of what I select or produce for the foundation or "key image" I must combine with that "key image" a single color, two colors or three colors. The means which I adopt for combining or applying color or colors to my "key image" will next be described.

The first step in the color branch of my invention is, when a single color product is desired, to make a print in which an area of the gelatine corresponding to the area designated, Red, in the subject, will be differentiated from the gelatine in the other areas corresponding to the other areas of the subject. This print, I will designate a "printing negative." In order to produce this printing negative I may proceed in either one of two ways. I may print, using red negative Fig. 2, and blue-green positive Fig. 5, successively, thereby producing, Fig. 6, or I may print using blue-green negative Fig. 3 and red positive, Fig. 4, superimposed, producing Fig. 7. "Printing negative" Fig. 6 is a print in which the only clear gelatine is a record of the red color only of the subject, Fig. 1, and Fig. 7 is a print in which the area containing reduced silver is a record also of the red color only of the subject Fig. 1. It should also be observed that the "printing negative" Fig. 7, may be produced by printing directly from Fig. 6, and vice versa. I also desire to state that especially in motion picture work, if the blue-green filter negatives are made in one strip and the red filter negatives in another strip, then a positive may be made from either by a reversal of the original negative strip. By doing this the effects of shrinkage are obviated during the printing operation as the positive and negative will register exactly.

If I use Fig. 6 to produce color on my "key image" carrier I will first harden the gelatine in a manner well known to those skilled in the art, wherever there is reduced silver present. This hardening process is well known to those skilled in this art, as shown by the United States patents to Fox, No. 1,187,421 granted June 13, 1916, and to Donisthrope, No. 1,193,879 granted March 26, 1914.

After hardening, the "printing negative" will be dyed in a manner well known to those skilled in the art, the negative taking up dye only where the gelatine is unhardened or soft, that is where clear or in other words, where there is no changed light sensitive material as fully explained in the Fox and Donisthrope patents, supra. After the printing negative is dyed it may be pressed into contact with the gelatine carrying the "key image" and while in registry, in a manner well known to those skilled in the art, whereupon the gelatine will take up the dye in those areas corresponding to the areas colored red in the subject, so that there will thereby be produced a finished print having a black and white "key image" and colored red in those portions in which the subject is colored red and which may be viewed by transmitted light or projected on a screen as is well understood. This mechanical printing or imbibition is fully described in Practical Color Photography by E. J. Wall, copyrighted in 1922.

If I use Fig. 7, to produce color on my "key image" carrier I will proceed preferably by forming a relief. In order to form this relief I may proceed in any of the ways described in Practical Color Photography, supra, but I prefer to take the necessary steps for forming this relief as I develop, that is in developing the latent image which results in printing negative Fig. 7, I make use preferably of the developing bath set forth on page 92, of Practical Color Photography, and then proceed preferably as specified in the above mentioned work using warm water to wash away the soluble gelatine. I then dye the printing negative Fig. 7 and press the same in contact with the gelatine carrying the key image, producing a result comparable with that obtained by using Fig. 6.

If I desire a two color product, then I, in comparable manner form blue-green printing negatives Figs. 8 and 9. Fig. 8, will be made from the blue-green negative Fig. 3, and the red positive, Fig. 4, by printing successively, and Fig. 9 will be made from the blue-green positive, Fig. 5 and the red negative Fig. 2, superimposed. It is also to be observed that the printing negative illustrated by Fig. 9 may be made directly from Fig. 8 and vice versa.

Having obtained my printing negatives, Figs. 8 and 9, and bearing in mind that I may preferably specially develop Fig. 9, I preferably proceed with these printing negatives just as with Figs. 6 and 7 and press either one of them in contact with the gelatine bearing my "key image" which has already been tinted red, so that I thereby obtain as a final product, a two color product, which may be illustrated as by Fig. 10.

If I desire a three color product then for the red printing negative, I preferably use the red negative and green positive successively; for the green printing negative the green negative and red positive used successively; and for the blue printing negaitve the blue negative and red or green positive used successively. This would give me printing negatives comparable with Figs. 6 and 8. For relief printing negatives I would use preferably for the red printing negatives, a green negative and a red positive, superimposed; for the green printing negative, a green positive and red negative superimposed; and for the blue printing negative, a blue positive and a green or red negative superimposed.

In making relief printing negatives I preferably print through the back of the carrier, that is the side which does not carry the emulsion or gelatine coating and preferably use an emulsion containing a light restraining dye such as safranine or tartrazine, whereby I obtain a low relief and one which is supported best by the carrier after I have washed away the soluble gelatine in warm water.

A result which is usable may be had by fully exposing through the back and giving a short development in a developer containing one gram of potassium iodide per 4000 ccs. of solution.

The dyes used for staining or dyeing the printing negatives are acid dyes of the nitro coloring matter group. They are used in aqueous solution which is soured with acetic acid. Trade names for some of the dyes suitable for this dyeing operation are, Guinee green, which is a sodium salt of diethyldibenzyl-diamido-triphenyl-carbinol-trisulphonic acid, Ponceau R, which is a sodium salt of xylene-azo-B-naphthol-disulphonic acid, Crocein scarlet 4 BX, which is a sodium salt of p-sulphonaphthalene-azo-B-naphthol-disulphonic acid. If gelatine relief matrices are used then either or both acid and basic dyes may be utilized.

A finished print made in the manner set forth is inexpensive to manufacture, has a key print comparable with modern standards of black and white photography and has a color or colors correctly placed and of subdued character.

If coloring of motion picture film is to be carried out then the colors will be applied to the key image carrier by a machine moving continuously, such for instance as described in the patents to Wyckoff and Handschiegel No. 1,303,836, dated May 13, 1919 and No. 1,303,837, dated May 13, 1919 or Handschiegel No. 1,316,791, dated September 23, 1919 or Taussig, No. 1,396,791, dated November 15, 1921 and 1,398,286, dated November 29, 1921.

Although I have explained the principle of my invention and described applications of the principle thereof, nevertheless I desire to have it understood that the specific illustrations explained and described are illustrative merely and do not exhaust the possible physical embodiments of means underlying my invention.

What I claim as new and desire to secure by Letters Patent of the United States, is:

1. A transparent carrier coated with gelatine having a reduced silver image and a dye-impressed color representation of the red in the original subject.

2. A transparent carrier carrying in a gelatine coating a reduced silver image and dye impressions representing the reds and blue-greens of the objects photographed.

3. A transparent carrier carrying in a gelatine coating a reduced silver image in black and white and dye impressions representing the reds and blue-greens of the objects photographed.

4. A transparent carrier having in a single gelatine coating a black to white photograph and dye impressions of two partial images representing respectively the blue-greens and the reds of the objects photographed.

5. A transparent carrier having in a single gelatine coating on one side a reduced silver photographic completed image and one or more dye impressed partial images each of one filtered color from the original subject photographed.

6. The process of making photographs in colors which consists in printing from color selection negatives onto single coated stock a black to white complete record of the object photographed and then dye impressing partial color records, made by combining positives of one color with negatives of the complementary color to obtain matrices representing the particular color only of the object photographed, onto the black and white record.

WILLIAM V. D. KELLEY.